United States Patent [19]

Yukawa

[11] 4,138,634
[45] Feb. 6, 1979

[54] AUTOMATIC VOLTAGE REGULATOR FOR AN AC GENERATOR WITH A FIELD WINDING

[75] Inventor: Hideki Yukawa, Susono, Japan

[73] Assignee: Kokusan Denki Co., Ltd., Numazu, Japan

[21] Appl. No.: 810,016

[22] Filed: Jun. 27, 1977

[30] Foreign Application Priority Data

Jul. 19, 1976 [JP] Japan .................... 51-95840[U]

[51] Int. Cl.² ............... H02J 7/24; H02P 9/30
[52] U.S. Cl. ........................... 322/28; 322/59; 322/72
[58] Field of Search .............. 322/25, 59, 61, 63, 322/69, 72, 29, 32, 20, 28, ; 320/64, 68; 323/22.5 C, 89, 34–37

[56] References Cited

U.S. PATENT DOCUMENTS 3,714,541  1/1973  Kuwabara et al. ............ 322/59 X
3,737,760  6/1973  Kiwaki et al. ................ 322/28

OTHER PUBLICATIONS

G.E. SCR Manual, 4th Edition, p. 70.

*Primary Examiner*—Robert J. Hickey
*Attorney, Agent, or Firm*—Woodling, Krost, Granger & Rust

[57] ABSTRACT

An automatic voltage regulator for an excited AC generator comprising at least one controlled rectifier for conducting the field current of the generator, a trigger signal supplying means for supplying a trigger signal to the controlled rectifier when the controlled rectifier is forward biased, a voltage detection circuit for detecting the output voltage of the generator, an inhibiting circuit for inhibiting turn-on of the controlled rectifier when the instantaneous value of the voltage detection circuit exceeds a predetermined voltage, characterized in that the voltage detection circuit comprises a phase shifting circuit receiving and shifting the phase of the output voltage of the generator. The amount of phase shift may be selected so that the inhibiting operation terminates and hence the turn-on of the controlled rectifier is effected at any angle within a wide range to adjust to the load being energized.

5 Claims, 9 Drawing Figures

AUTOMATIC VOLTAGE REGULATOR FOR AN AC GENERATOR WITH A FIELD WINDING

BACKGROUND OF THE INVENTION

The present invention relates to an automatic voltage regulator for an AC generator with a field winding, namely a self-excited generator or a separately excited generator.

A conventional automatic voltage regulator for an AC generator includes a thyristor connected in series with a field winding to control the field current. The thyristor receives its gate signal from its anode through a resistor, so that it conducts a field current whenever the anode is forward biased and the output of the generator will be increased, unless some inhibiting operation, i.e. voltage regulation is effected. To accomplish voltage regulation, the voltage regulator comprises a voltage detection circuit adapted to detect the output voltage of the generator and to provide a rectified voltage with a ripple. As the instantaneous value of the rectified voltage exceeds a predetermined value, triggering of the thyristor is inhibited by shorting the gate and cathode of the thyristor by means of a transistor. Accordingly, after the output voltage of the generator has been established, application of the gate signal to the thyristor is made possible only when the instantaneous value of the rectified voltage falls below the predetermined value at the "valleys" of the rectified voltage waveform.

Where the exciting voltage is in phase with the output voltage of the generator, the thyristor is either made conductive throughout 180° or made non-conductive throughout 180°, because the rectified voltage waveform is such that its "valleys" appear at the moments when the instantaneous value of the exciting voltage begins to rise. This is unsatisfactory because the resultant output voltage has substantial fluctuation.

Where an exciting winding for providing a field current is positioned 90° (electrical angle) apart from the armature winding, the "valleys" of the rectified voltage appear when the exciting voltage is approximately at its peaks. The angle at which the instantaneous value of the rectified voltage falls below the predetermined value varies, but within the range of from 0° to 90°, so that the conduction angle through which the thyristor is conductive cannot be smaller than 90°. Consequently, if a smaller average angle of conduction corresponding to smaller field current is needed, conduction of the thyristor through 90° or more and non-conduction through 180° are repeated, that is irregular operation occurs, resulting in undesirable fluctuation of the generator's output.

SUMMARY OF THE INVENTION

An object of the present invention is to provide an automatic voltage regulator for an AC generator with a field winding capable of minimizing voltage fluctuation.

An automatic voltage regulator of the invention comprises at least one controlled rectifier for conducting the field current of the generator, a trigger signal supplying means for supplying trigger signal to the controlled rectifier when the controlled rectifier is forward biased. The trigger signal supplying means may comprise an auxiliary controlled rectifier having its anode and cathode coupled to the anode and gate of the main controlled rectifier and means coupling the anode and gate of the auxiliary controlled rectifier. The voltage regulator further comprises a voltage detection circuit for detecting the output voltage of the generator. The detection circuit of the invention comprises a phase shifting circuit shifting the phase of the generator's output voltage. The detection circuit may further includes a full-wave rectifier receiving and rectifying the output of the phase shifting circuit, and also a smoothing capacitor for smoothing the output of the full-wave rectifier. The voltage regulator further comprises an inhibiting circuit for inhibiting application of a trigger signal to and hence turn-on of the main controlled rectifier when the instantaneous value of the output of the voltage detection circuit exceeds a predetermined value. The inhibiting circuit may comprise a Zener diode adapted to conduct when the instantaneous value of the output of the detection circuit exceeds the predetermined value and a transistor adapted to short the gate and cathode of the auxiliary controlled rectifier. The amount of phase shift by the phase shifting circuit may be determined freely, and may be readily changed. It is therefore possible to make the angle at which the "valleys" of the rectified voltage waveform to appear a little in advance of the end of each half cycle. This will enable the conduction angle through which the controlled rectifier is conductive to be at any value from minimum to 180° to provide the desired average value of the field current. If the load and other conditions are kept constant, the field current flows regularly for substantially constant angle, proportional to the field current necessary as well as sufficient, during each half cycle the controlled rectifier is forward biased. The output voltage fluctuation is therefore minimized.

BRIEF DESCRIPTION OF THE DRAWINGS

Other features and advantages of the present invention will be apparent from the following description taken in conjunction with the accompanying drawings, in which.

DETAILED DESCRIPTION OF THE PREFERRED EMBODIMENTS

Figure 1:
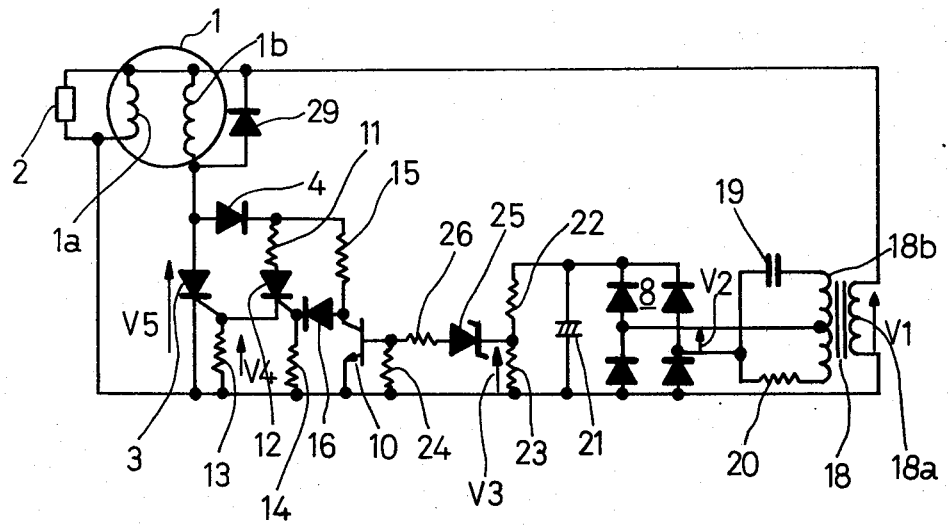
FIG. 1 shows a circuit diagram of an embodiment of the invention.

Referring now more particularly to FIG. 1, there is shown an embodiment of a voltage regulator according to the present invention, adapted to regulate the output voltage of a self-excited AC generator including an armature winding 1a for energizing a load 2, and a field winding 1b connected across the armature winding 1a through a main thyristor 3 adapted to serve as a main controlled rectifier to conduct the field current. The field winding is provided with a diode 29 connected thereacross to protect the winding from reverse voltages and to maintain a certain amount of field current even when the main thyristor is turned off. An auxiliary thyristor 12 is provided to serve as an auxiliary controlled rectifier and has its cathode connected to the gate of the main thyristor 3. The anode of the auxiliary thyristor 12 is connected through a resistor to the cathode of a diode 4, whose anode is connected to the anode of the main thyristor 3. A resistor 13 is connected across the gate and cathode of the main thyristor 3. A resistor 14 is connected across the gate of the auxiliary thyristor 12 and the cathode of the main thyristor 3. The cathode of the diode 4 is connected through a resistor 15 to the anode of a diode 16, whose cathode is connected to the gate of the auxiliary thyristor 12. The members 4 and 11–16 form a trigger signal supplying means of the invention.

The output $V_1$ of the armature winding 1a is supplied to a phase shifting circuit, where its phase is shifted. In the embodiment illustrated, the phase shifting circuit comprises a Toulon circuit comprising a transformer 18 including a primary winding 18a and secondary winding 18b with a center tap and a series circuit of a capacitor 19 and a resistor 20. The output voltage $V_2$ of the phase shifting circuit obtained across the center tap of the secondary winding 18b and the junction of a capacitor 19 and a resistor 20 is supplied to a full-wave rectifier 8, whose output voltage is supplied to a smoothing capacitor 21. The members 18–21 as well as 8 form a voltage detection circuit of the invention.

The output of the voltage detection circuit, namely the voltage across the capacitor 21 is applied across a series circuit of resistors 22 and 23 serving as a voltage divider producing its output across the resistor 23, the output of the voltage divider being supplied through a Zener diode 25 and a resistor 26 connected in series with the Zener diode 25 across the base and emitter of a transistor 10 having its collector connected to the anode of the diode 16 and having its emitter connected to the cathode of the main thyristor 3. A resistor 24 is connected across the base and emitter of the auxiliary thyristor 12. The members 22–26 as well as 10 form an inhibiting circuit of the invention.

Figure 2:
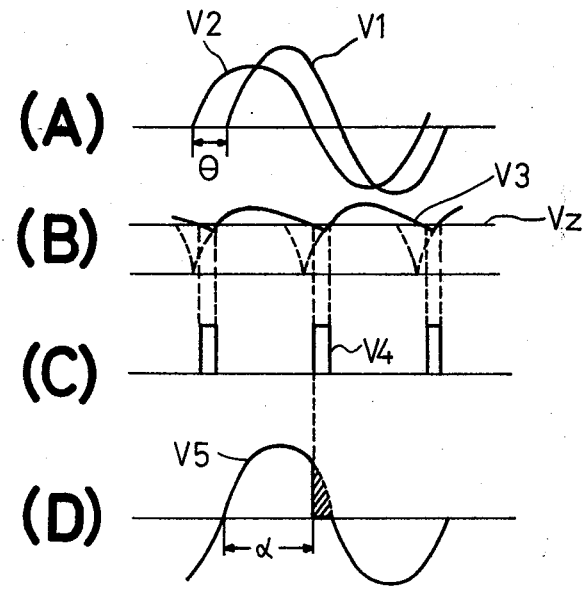
FIGS. 2(A) through (D) show waveforms of voltages at various portions of the voltage regulator of FIG. 1, FIGS. 3 and 4 show examples of phase shifting circuits which may be incorporated in the voltage regulator of the invention.

In operation, the voltage $V_2$ across the output terminals of the phase shifting circuit is in advance in phase by an angle $\theta$ of the output voltage $V_1$ as shown in FIG. 2A. The DC voltage $V_3$ across the resistor 23 corresponds in magnitude to the voltage $V_2$ is effectively compared with a reference voltage determined predominantly by the Zener voltage of the Zener diode 25, and when the voltage $V_3$ exceeds the Zener voltage, the Zener diode 25 conducts a base current to the transistor 10. As the instantaneous value of the output voltage of the generator rises, the voltage $V_3$ exceeds the Zener voltage $V_z$, the transistor 10 is conductive, so that turn-on of the auxiliary thyristor 12 and hence the main thyristor 3 is prevented or inhibited. As the voltage $V_3$ falls below the Zener diode $V_3$, the transistor becomes non-conductive. Accordingly, the auxiliary thyristor 12 will have a gate current and will therefore conduct, so that a voltage $V_4$ as shown in FIG. 2C is applied across the gate and cathode of the main thyristor 3, to make it conductive throughout the period indicated by hatching. The voltage $V_5$ across the anode and cathode of the main thyristor 3 will thus become as shown in FIG. 2D, $\alpha$ being the angle at which the main thyristor 3 is turned on. The turn-on angle $\alpha$ can be made to approach 180° by appropriate determination of the amount of phase shift by the phase shifting circuit. Consequently, it is possible to minimize the conduction angle throughout which the main thyristor 3 is conductive. The result is that the generator is capable of providing a stable output with minimized fluctuation, even if the load to be energized is quite small.

Since the auxiliary thyristor 12 is required to permit an anode current no more than is necessary to turn on the main thyristor, a thyristor with high gate sensitivity may be employed. The resistor 15 may be of a high resistance to restrict the current therethrough, yet it is possible to turn on the auxiliary thyristor 12 while the generator is driven at low speeds. The output voltage of the generator can thus be established at low speeds. In addition, since the current flowing through the auxiliary thyristor is small, the gate trigger level of the auxiliary thyristor hardly varies, so that the voltage fluctuation can be further reduced. Moreover, use of the phase shifting circuit eliminates the need for an exciter coil in quadrature with the armature winding, and as a result the construction of the generator can be simplified.

Figure 3:
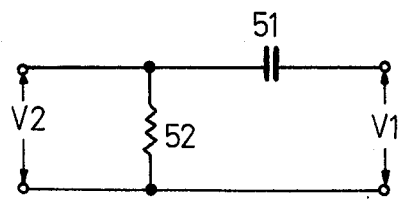
Figure 4:
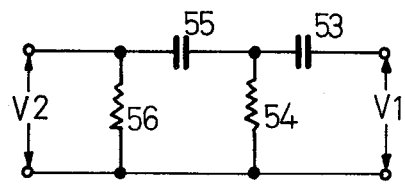

In the embodiment described above, a Toulon circuit is employed as a phase shifting circuit. The Toulon circuit is convenient because of its capability of varying its output phase throughout 180°. But, any other phase shifting circuit such as shown in FIGS. 3 and 4 may be substituted. The circuit of FIG. 3 comprises a capacitor 51 having one terminal connected to one of the input terminal and having the other terminal connected through a resistor 52 to the other input terminal. Both ends of the resistors 52 are connected to the output terminals. The circuit of FIG. 4 comprises two cascaded circuits comprising capacitors 53 and 55 and resistors 54 and 56, each being similar to that shown in FIG. 3.

Figure 5:
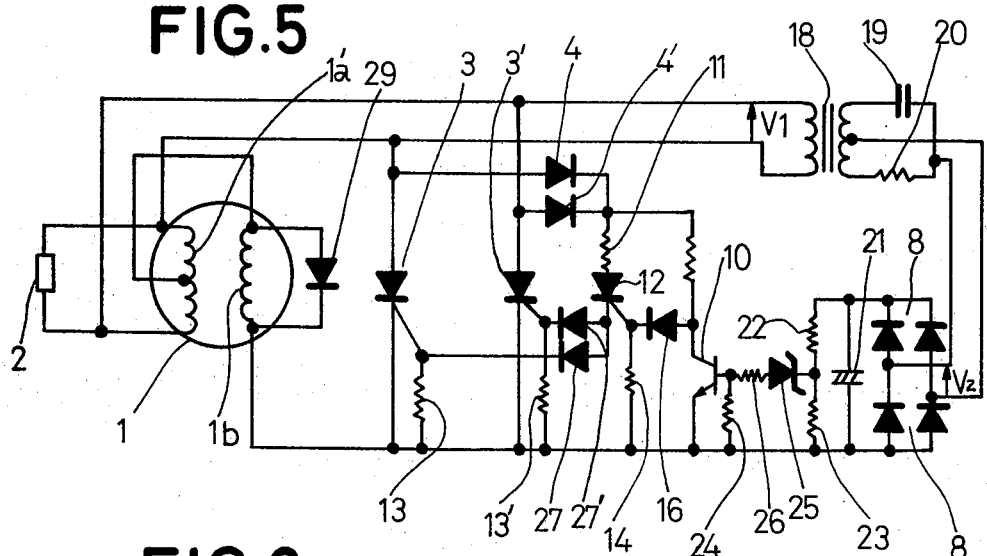
FIGS. 5 and 6 show other embodiments of the invention.

FIG. 5 shows another embodiment of the invention, adapted to operate with an AC generator including an armature winding 1a with a center tap. The field winding 1b is connected through a first main thyristor 3 across one end and the center tap of the armature winding 1a and is also connected through a second main thyristor 3' across the other end and the center tap of the armature winding 1a. The anodes of the thyristors 3,3' are respectively connected to the anodes of diodes 4,4', whose cathodes are connected to each other. An auxiliary thyristor 12 has its anode connected through a resistor 11 to the cathodes of the diodes 4,4', and has their cathodes connected respectively through diodes 27,27' to the gates of the main thyristors 3,3', so that the auxiliary thyristor 12 supplies gate current to both of the main thyristors. A resistor 13' is connected across the gate and cathode of the main thyristor. The rest of the construction is similar to that of FIG. 1. The operation is substantially similar to that of the embodiment of FIG. 1 except that full-wave rectification with phase-control is effected by the main thyristors 3,3'.

Figure 6:
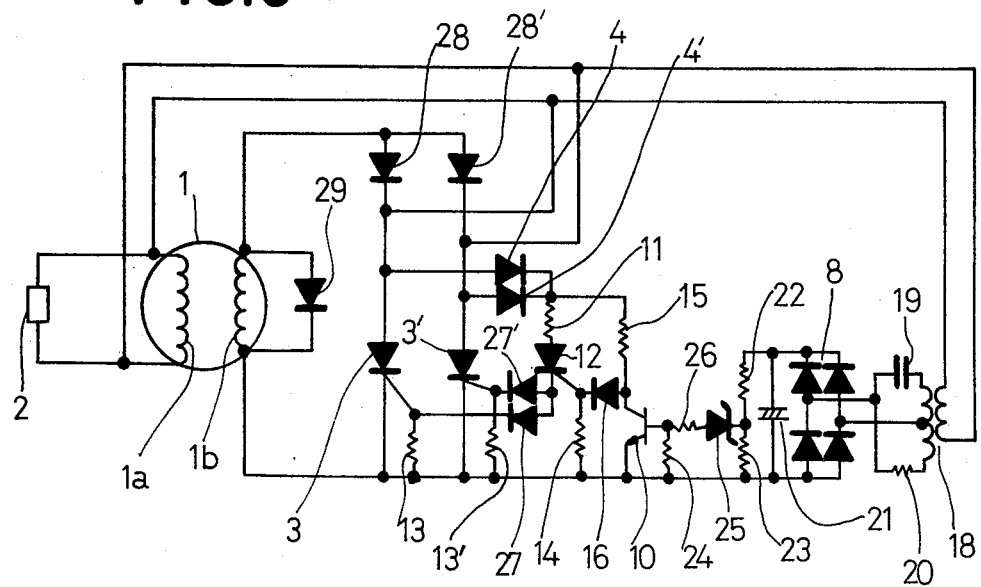

FIG. 6 shows still another embodiment of the invention, wherein two main thyristors 3,3' and two diodes 28,28' form a full-wave rectifier circuit with phase control function, through which the armature winding 1a similar to that shown in FIG. 1 supplies field current. The rest of the construction and the operation are substantially similar to those of the embodiment of FIG. 5.

The present invention is applicable not only to a self-excited AC generator as has been described but also to any types of separately excited AC generator. The invention is also applicable to an AC generator provided with a field winding as well as permanent magnets attached to the core of the field winding, wherein establishment of the field causing magnetic flux linkage with the armature winding of the generator is relied on the permanent magnets when the generator is started, and when the armature winding begins to induce a voltage it begins to supply a field current to the field winding.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is;

1. An automatic voltage regulator for an AC generator with a field winding comprising at least one controlled rectifier for conducting the field current of the generator, a trigger signal supplying means for supplying a trigger signal to said controlled rectifier when said controlled rectifier is forward biased, a voltage detection circuit for detecting the output voltage of the generator, and an inhibiting circuit for inhibiting turn-on of said controlled rectifier when the instantaneous value of the output of the voltage detection circuit exceeds a predetermined value, characterized in that said voltage detection circuit comprises a phase shifting circuit shifting the phase of the output voltage of the generator.

2. An automatic voltage regulator as set forth in claim 1, wherein said phase shifting circuit comprises a Toulon circuit.

3. An automatic voltage regulator as set forth in claim 1, wherein said voltage detection circuit further comprises a full-wave rectifier for effecting full-wave rectification of the output of said phase shifting circuit and a smoothing capacitor receiving and smoothing the output of said full-wave rectifier and providing its own output as the output of said voltage detection circuit.

4. An automatic voltage regulator as set forth in claim 1, wherein said trigger signal supplying means comprises an auxiliary controlled rectifier having its anode and cathode coupled to the anode and gate of said main controlled rectifier respectively, and means coupling the anode and gate of said auxiliary controlled rectifier.

5. An automatic voltage regulator as set forth in claim 4, wherein said inhibiting circuit comprises a Zener diode adapted to conduct when the instantaneous value of the output voltage of said voltage detection circuit exceeds a predetermined value, and a transistor adapted to be conductive when said Zener diode conducts to short the gate and cathode of said auxiliary controlled rectifier.

* * * * *